US012786294B2

(12) United States Patent
Ji et al.

(10) Patent No.: US 12,786,294 B2
(45) Date of Patent: *Nov. 3, 2026

(54) MULTICAST PACKET PROCESSING METHOD AND DEVICE

(71) Applicant: HUAWEI TECHNOLOGIES CO., LTD., Shenzhen (CN)

(72) Inventors: Yeyi Ji, Nanjing (CN); Fang Xin, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 423 days.

This patent is subject to a terminal disclaimer.

(21) Appl. No.: 18/461,597

(22) Filed: Sep. 6, 2023

(65) Prior Publication Data

US 2023/0421483 A1 Dec. 28, 2023

Related U.S. Application Data

(63) Continuation of application No. 17/727,981, filed on Apr. 25, 2022, now Pat. No. 11,784,915, which is a (Continued)

(30) Foreign Application Priority Data

Oct. 26, 2019 (CN) ........................ 201911026901.7

(51) Int. Cl.
*H04L 69/22* (2022.01)
*H04L 12/18* (2006.01)
(Continued)

(52) U.S. Cl.
CPC .............. *H04L 69/22* (2013.01); *H04L 12/18* (2013.01); *H04L 45/16* (2013.01); *H04L 45/74* (2013.01); *H04L 47/2483* (2013.01)

(58) Field of Classification Search
None
See application file for complete search history.

(56) References Cited

U.S. PATENT DOCUMENTS 11,784,915 B2 * 10/2023 Ji ........................ H04L 43/0852 370/231
2017/0093685 A1 3/2017 Retana et al.
(Continued)

FOREIGN PATENT DOCUMENTS

| | | | |
|---|---|---|---|
| CN | 1770671 | A | 5/2006 |
| WO | 2018210213 | A1 | 11/2018 |

OTHER PUBLICATIONS

H. Song, Ed. et al., Requirement and Solution for Multicast Traffic Telemetry; draft-song-multicast-telemetry-00, Network Working Group, Jul. 1, 2019, 10 pages.

(Continued)

*Primary Examiner* — Anh Ngoc M Nguyen

(57) ABSTRACT

A method and device for multicast packet processing are disclosed. The method includes: A first network device obtains a data packet; and the first network device generates a first multicast packet and a second multicast packet based on the data packet. The first multicast packet includes first iFIT information and a first multi-level flow identifier. The second multicast packet includes the first iFIT information and a second multi-level flow identifier. The first multi-level flow identifier and the second multi-level flow identifier are different, to identify different forwarding paths of the generated first multicast packet and second multicast packet respectively. In the method, in a point-to-multipoint multicast data flow transmission scenario, a plurality of multicast data flows can be identified, to perform iFIT detection on each of the plurality of data flows, so as to implement packet loss and delay detection, path restoration, and the like for the multicast data flows.

20 Claims, 9 Drawing Sheets

Related U.S. Application Data continuation of application No. PCT/CN2020/092710, filed on May 27, 2020.

(51) Int. Cl.

| | |
|---|---|
| ***H04L 45/16*** | (2022.01) |
| ***H04L 45/74*** | (2022.01) |
| ***H04L 47/2483*** | (2022.01) |

(56) References Cited

U.S. PATENT DOCUMENTS

| | | | | |
|---|---|---|---|---|
| 2018/0331890 | A1 | 11/2018 | Song et al. | |
| 2019/0288938 | A1 | 9/2019 | Song | |
| 2019/0306056 | A1* | 10/2019 | Jeuk | H04L 45/74 |
| 2019/0319876 | A1 | 10/2019 | Gumaste et al. | |
| 2019/0349290 | A1 | 11/2019 | Pignataro et al. | |
| 2019/0372877 | A1* | 12/2019 | Nainar | H04L 45/16 |
| 2020/0322353 | A1 | 10/2020 | Bhandari et al. | |
| 2022/0247668 | A1 | 8/2022 | Ji et al. | |
| 2022/0338381 | A1 | 10/2022 | Wu et al. | |

OTHER PUBLICATIONS

H. Song, Ed. et al., "In-situ Flow Information Telemetry Framework draft-song-opsawg-ifit-framework-00", Apr. 25, 2019, total 9 pages.

H. Song, Ed. et al., "Export User Flow Telemetry Data by Postcard Packets draft-song-ippm-postcard-based-telemetry-00", Oct. 20, 2018, total 16 pages.

H. Song, Ed. et al., MPLS Extension Header draft-song-mpls-extension-header-01, Feb. 9, 2019, total 13 pages.

T. Zhou, Ed. et al., "Enhanced Alternate Marking Method draft-zhou-ippm-enhanced-alternate-marking-00", total 5 pages.

H. Song, Ed. et al., "Requirement and Solution for Multicast Traffic Telemetry draft-song-multicast-telemetry-00", Jan. 2, 2020, total 8 pages.

Office Action issued in CN201911026901.7, dated Jan. 4, 2022, 8 pages.

Bo Lu et al., iFIT: Intelligent Flow Information Telemetry, SIGCOMM 19, Aug. 19-24, 2019, Beijing, China, 3 pages.

Extended European Search Report issued in EP20878614.5, dated Sep. 26, 2022, 11 pages.

* cited by examiner

| | Flow Information | | | | | | | |
|---|---|---|---|---|---|---|---|---|
| Content | Flow table type | Source IP address | Destination IP address | Source IP address mask | Destination IP address mask | Source port number | Destination port number | Protocol number |
| | Flow table direction | Index of an ingress interface | Index of an egress interface | Flow identifier | **Multi-level flow identifier (Flow ID multi)** | ... | | |
| | | | | | **Level information 1, level information 2, level information 3, ...** | | | |

| | iFIT detection data | | | | |
|---|---|---|---|---|---|
| Content | Period number | Packet quantity | Byte quantity | Timestamp | ... |

FIG. 4

| | **Flow Information** | | | | | | | |
|---|---|---|---|---|---|---|---|---|
| Content | Flow table type | Source IP address | Destination IP address | Source IP address mask | Destination IP address mask | Source port number | Destination port number | Protocol number |
| | Flow table direction | Index of an ingress interface | Index of an egress interface | Flow identifier | **Multi-level flow identifier (Flow ID multi)** | | | ... |
| | | | | | **Series (series)** | **Device identifier (nodeID)** | **Multicast flow identifier (bumflowID)** | |

| | **iFIT detection data** | | | | |
|---|---|---|---|---|---|
| Content | Period number | Packet quantity | Byte quantity | Timestamp | ... |

FIG. 7

MULTICAST PACKET PROCESSING METHOD AND DEVICE

CROSS-REFERENCE TO RELATED APPLICATIONS

This application is a continuation of U.S. patent application Ser. No. 17/727,981, filed on Apr. 25, 2022, which is a continuation of International Application No. PCT/CN2020/092710, filed on May 27, 2020, which claims priority to Chinese Patent Application No. 201911026901.7, filed on Oct. 26, 2019. All of the aforementioned patent applications are hereby incorporated by reference in their entireties.

TECHNICAL FIELD

Embodiments of this application relate to the field of communications technologies, and in particular, to a packet processing method and a device that are used when in-situ flow information telemetry (iFIT) performance detection is performed on a point-to-multipoint multicast flow.

BACKGROUND

Conventionally, an operation, administration and maintenance (OAM) detection technology is used in Ethernet to indirectly simulate an actual service by sending an out-of-band simulated detection packet. However, in this detection mode, consistency between paths of the simulated packet and the actual service cannot be ensured, and network service quality cannot be fully and truly reflected. To meet a higher requirement of a 5G bearer network for performance monitoring, an iFIT technology for in-situ flow measurement is provided. iFIT is an in-band in-situ flow detection technology. Feature marking is performed on actual service traffic, and end-to-end and hop-by-hop detection capabilities for real service traffic are provided based on a feature-marked field, to detect a network performance indicator in real time. In a current iFIT detection solution, a point-to-point data flow can be identified, and corresponding detection can be performed based on the identified data flow. However, for multicast replicated flows generated in a point-to-multipoint scenario, each multicast flow cannot be identified yet, and therefore packet loss and delay measurement and path restoration cannot be implemented for the multicast flows.

SUMMARY

Example embodiments of this application provide a method and a device for multicast packet processing, to implement iFIT detection on a multicast flow in a point-to-multipoint application scenario.

According to a first aspect, an embodiment of this application provides a multicast packet processing method. The method includes: A first network device obtains a packet, where the packet includes a payload. The first network device generates a first multicast packet and a second multicast packet based on the packet. The first multicast packet includes a first multicast packet header and the payload. The first multicast packet header includes first in-situ flow information telemetry information and a first multi-level flow identifier. The first multi-level flow identifier is for identifying a first forwarding path of the payload. The first forwarding path includes a path from the first network device to a second network device. The second multicast packet includes a second multicast packet header and the payload. The second multicast packet header includes a second multi-level flow identifier and the first in-situ flow information telemetry information. The second multi-level flow identifier is for identifying a second forwarding path of the payload. The second forwarding path includes a path from the first network device to a third network device. The first in-situ flow information telemetry information indicates the second network device to perform in-situ flow information telemetry on a flow to which the first multicast packet including the first multi-level flow identifier belongs. The first in-situ flow information telemetry information indicates the third network device to perform in-situ flow information telemetry on a flow to which the second multicast packet including the second multi-level flow identifier belongs. The second network device and the third network device are next-hop network devices of the first network device. The first network device sends the first multicast packet to the second network device through the first forwarding path, and sends the second multicast packet to the third network device through the second forwarding path.

In the method, in a point-to-multipoint multicast data flow transmission scenario, a plurality of multicast data flows can be identified, to perform in-situ flow information telemetry detection on each of the plurality of data flows, so as to implement packet loss and delay detection, path restoration, and the like for the multicast data flows.

In an example embodiment, that the first network device generates a first multicast packet and a second multicast packet based on the packet includes: The first network device generates the first multi-level flow identifier, where the first multi-level flow identifier includes first level information, the first level information is for identifying a path that corresponds to the payload and that is from the first network device to the second network device, the first level information includes a first multicast flow identifier, and the first multicast flow identifier is for identifying a multicast data flow to which the first multicast packet belongs; and the first network device generates the second multi-level flow identifier, where the second multi-level flow identifier includes second level information, the second level information is for identifying a path that corresponds to the payload and that is from the first network device to the third network device, the second level information includes a second multicast flow identifier, the second multicast flow identifier is for identifying a multicast data flow to which the second multicast packet belongs, and the second multicast flow identifier is different from the first multicast flow identifier.

In an example embodiment, the first level information and the second level information further include a first device identifier, and the first device identifier is for identifying the first network device.

In an example embodiment, the packet is a third multicast packet, the third multicast packet includes a third multicast packet header and the payload, the third multicast packet header includes the first iFIT information and a third multi-level flow identifier, the third multi-level flow identifier includes third level information, the third level information is for identifying a path that corresponds to the payload and that is from a fourth network device to a fifth network device, the fifth network device is a next-hop network device of the fourth network device, the third level information includes a third multicast flow identifier, the third multicast flow identifier is for identifying a multicast data flow to which the third multicast packet belongs, and the first multi-level flow identifier and the second multi-level flow identifier each further includes the third level information.

In an example embodiment, the third level information further includes a fourth device identifier, and the fourth device identifier is for identifying the fourth network device.

Based on a multi-level flow identifier including level information, the network device can quickly identify different multicast data flows generated through replication in a point-to-multipoint scenario, and a network management device can restore an end-to-end transmission path of a specific multicast flow based on the multi-level flow identifier, and determine a packet loss and a delay on the end-to-end transmission path.

In an example embodiment, that the first network device generates a first multicast packet and a second multicast packet based on the packet specifically includes: The first network device generates the first multi-level flow identifier, where the first multi-level flow identifier includes first series information and a first multicast flow identifier, the first series information is for identifying that the first network device generates the first multicast packet and the second multicast packet based on the packet, and the first multicast flow identifier is for identifying a multicast data flow to which the first multicast packet belongs; and the first network device generates the second multi-level flow identifier, where the second multi-level flow identifier includes the first series information and a second multicast flow identifier, the second multicast flow identifier is for identifying a multicast data flow to which the second multicast packet belongs, and the second multicast flow identifier is different from the first multicast flow identifier.

In an example embodiment, the first multi-level flow identifier and the second multi-level flow identifier further include a first device identifier, and the first device identifier is for identifying the first network device.

In an example embodiment, the packet is a third multicast packet, the third multicast packet includes a third multicast packet header and the payload, the third multicast packet header includes the first iFIT information and a third multi-level flow identifier, the third multi-level flow identifier includes second series information and a third multicast flow identifier, and the third multicast flow identifier is for identifying a multicast data flow to which the third multicast packet belongs. That the first network device generates a first multicast packet and a second multicast packet based on the packet further includes: The first network device generates the first series information based on the second series information of the third multi-level flow identifier of the packet.

In an example embodiment, the third multi-level flow identifier further includes a second device identifier, and the second device identifier is for identifying the fourth network device.

Based on different quantities of data flow replications, the network device may assign different series to replicated multicast data flows at different replication locations, and the network management device may directly restore, by using the series and other field information, a path through which a multicast data flow passes. This greatly saves bandwidth resources, and improves communication efficiency and accuracy.

In an example embodiment, the method further includes: The first network device sends a first message and a second message to the network management device. The first message carries the first multi-level flow identifier of the first multicast packet and first information. The first information is information determined by the first network device based on the first in-situ flow information telemetry information in the first multicast packet. The second message carries the second multi-level flow identifier of the second multicast packet and second information. The second information is information determined by the first network device based on the first in-situ flow information telemetry information in the second multicast packet.

According to a second aspect, an embodiment of this application provides a first network device. The first network device includes: an obtaining unit, configured to obtain a packet, where the packet includes a payload; a generation unit, configured to generate a first multicast packet and a second multicast packet based on the packet, where the first multicast packet includes a first multicast packet header and the payload, the first multicast packet header includes first in-situ flow information telemetry information and a first multi-level flow identifier, the first multi-level flow identifier is for identifying a first forwarding path of the payload, the first forwarding path includes a path from the first network device to a second network device, the second multicast packet includes a second multicast packet header and the payload, the second multicast packet header includes a second multi-level flow identifier and the first in-situ flow information telemetry information, the second multi-level flow identifier is for identifying a second forwarding path of the payload, the second forwarding path includes a path from the first network device to a third network device, the first in-situ flow information telemetry information indicates the second network device to perform in-situ flow information telemetry on a flow to which the first multicast packet including the first multi-level flow identifier belongs, the first in-situ flow information telemetry information indicates the third network device to perform in-situ flow information telemetry on a flow to which the second multicast packet including the second multi-level flow identifier belongs, and the second network device and the third network device are next-hop network devices of the first network device; and a first sending unit, configured to send the first multicast packet to the second network device through the first forwarding path, and send the second multicast packet to the third network device through the second forwarding path.

In a point-to-multipoint multicast data flow transmission scenario, the foregoing network device can identify a plurality of multicast data flows that are generated through replication, to perform in-situ flow information telemetry detection on each of the plurality of data flows, so as to implement packet loss and delay detection, path restoration, and the like for the multicast data flows.

In an example embodiment, that the generation unit generates a first multicast packet and a second multicast packet based on the packet includes: The generation unit generates the first multi-level flow identifier, where the first multi-level flow identifier includes first level information, the first level information is for identifying a path that corresponds to the payload and that is from the first network device to the second network device, the first level information includes a first multicast flow identifier, and the first multicast flow identifier is for identifying a multicast data flow to which the first multicast packet belongs; and the generation unit generates the second multi-level flow identifier, where the second multi-level flow identifier includes second level information, the second level information is for identifying a path that corresponds to the payload and that is from the first network device to the third network device, the second level information includes a second multicast flow identifier, the second multicast flow identifier is for identifying a multicast data flow to which the second multicast packet belongs, and the second multicast flow identifier is different from the first multicast flow identifier.

In an example embodiment, the first level information and the second level information further include a first device identifier, and the first device identifier is for identifying the first network device.

In an example embodiment, the packet is a third multicast packet, the third multicast packet includes a third multicast packet header and the payload, the third multicast packet header includes the first in-situ flow information telemetry information and a third multi-level flow identifier, the third multi-level flow identifier includes third level information, the third level information is for identifying a path that corresponds to the payload and that is from a fourth network device to a fifth network device, the fifth network device is a next-hop network device of the fourth network device, the third level information includes a third multicast flow identifier, the third multicast flow identifier is for identifying a multicast data flow to which the third multicast packet belongs, and the first multi-level flow identifier and the second multi-level flow identifier each further includes the third level information.

In an example embodiment, that the generation unit generates a first multicast packet and a second multicast packet based on the packet specifically includes: The generation unit generates the first multi-level flow identifier, where the first multi-level flow identifier includes first series information and a first multicast flow identifier, the first series information is for identifying that the first network device generates the first multicast packet and the second multicast packet based on the packet, and the first multicast flow identifier is for identifying a multicast data flow to which the first multicast packet belongs; and the generation unit generates the second multi-level flow identifier, where the second multi-level flow identifier includes the first series information and a second multicast flow identifier, the second multicast flow identifier is for identifying a multicast data flow to which the second multicast packet belongs, and the second multicast flow identifier is different from the first multicast flow identifier.

In an example embodiment, the first multi-level flow identifier and the second multi-level flow identifier further include a first device identifier, and the first device identifier is for identifying the first network device.

In an example embodiment, the packet is a third multicast packet, the third multicast packet includes a third multicast packet header and the payload, the third multicast packet header includes the first in-situ flow information telemetry information and a third multi-level flow identifier, the third multi-level flow identifier includes second series information and a third multicast flow identifier, and the third multicast flow identifier is for identifying a multicast data flow to which the third multicast packet belongs. That the generation unit generates a first multicast packet and a second multicast packet based on the packet further includes: The first network device generates the first series information based on the second series information of the third multi-level flow identifier of the packet.

Based on different quantities of data flow replications, the network device may assign different series to replicated multicast data flows at different replication locations, and a network management device may directly restore, by using the series and other field information, a path through which a multicast data flow passes. This greatly saves bandwidth resources, and improves communication efficiency and accuracy.

In an example embodiment, the first network device further includes a second sending unit. The first network device sends a first message and a second message to the network management device. The first message carries the first multi-level flow identifier of the first multicast packet and first information. The first information is information determined by the first network device based on the first in-situ flow information telemetry information in the first multicast packet. The second message carries the second multi-level flow identifier of the second multicast packet and second information. The second information is information determined by the first network device based on the first in-situ flow information telemetry information in the second multicast packet.

According to a third aspect, an embodiment of this application provides a network device. The device includes a processor and a memory. The memory is configured to store a computer program. The processor is configured to invoke the computer program stored in the memory, to perform the method in any one of the example embodiments of the first aspect.

According to a fourth aspect, an embodiment of this application provides a network system. The system includes a network device and a network management device. The network device may perform the method in any one of the example embodiments of the first aspect, or the network device may be the first network device in the second aspect or the network device in the third aspect.

According to a fifth aspect, an embodiment of this application provides a computer-readable storage medium or a computer program product, configured to store a computer program. The computer program is used to perform the method in any example embodiment of the first aspect.

BRIEF DESCRIPTION OF DRAWINGS

To describe technical solutions in embodiments of this application more clearly, the following briefly describes accompanying drawings for describing the embodiments.

FIG. 4 is a schematic diagram of an example structure for sending a packet according to an embodiment of this application;

FIG. 7 is a schematic diagram of another example structure for sending a packet according to an embodiment of this application;

DESCRIPTION OF EMBODIMENTS

The following describes technical solutions in embodiments of this application with reference to the accompanying drawings. A network architecture and a service scenario described in embodiments of this application are intended to describe the technical solutions in embodiments of this application more clearly, and do not constitute any limitation on the technical solutions provided in embodiments of this application. A person of ordinary skill in the art may know that with evolution of the network architecture and emergence of a new service scenario, the technical solutions provided in embodiments of this application are also applicable to a similar technical problem.

Figure 1:
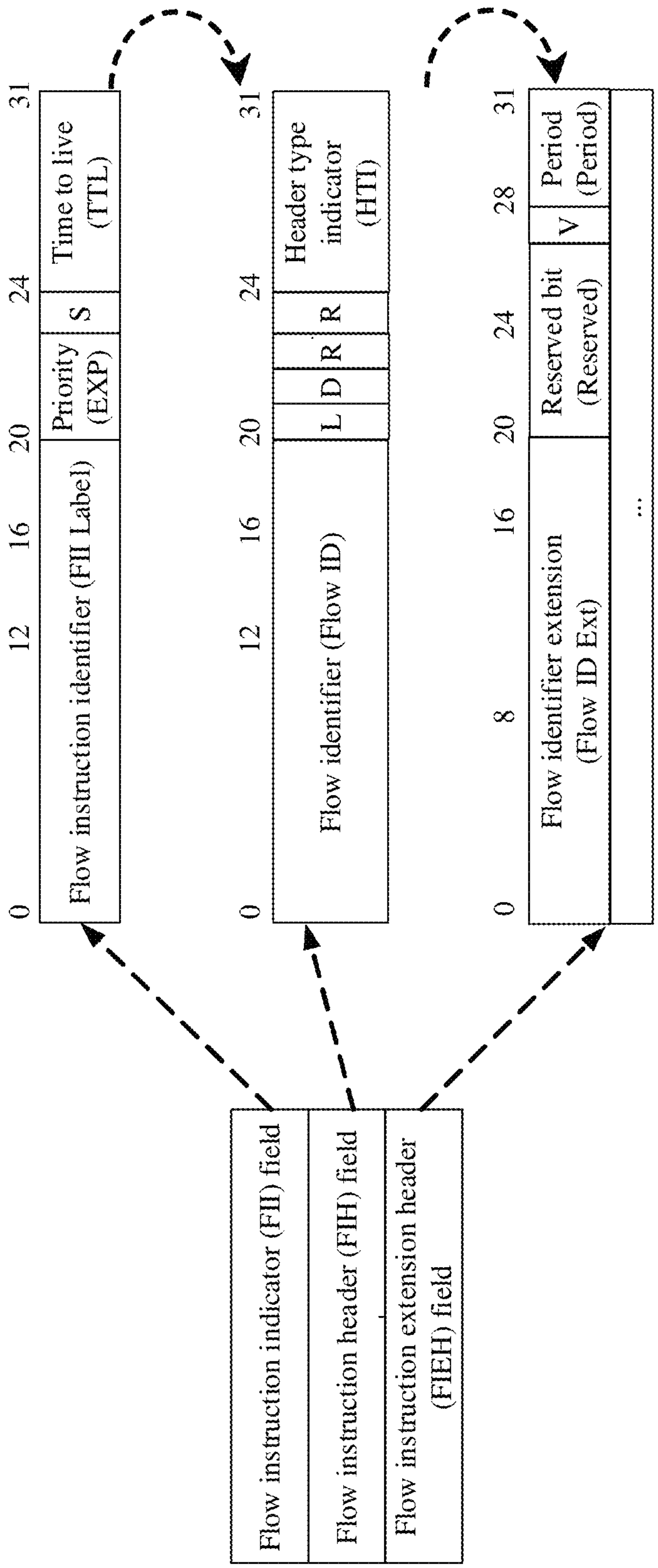
FIG. 1 is a schematic diagram of an example iFIT information header structure according to an embodiment of this application.

In an in-situ flow information telemetry (iFIT) technology, iFIT information carried in a packet may be used to perform feature marking on a node through which a flow in a network passes. The feature marking may also be referred to as coloring. The iFIT information may constitute an iFIT header as a whole, for example, may serve as an extension header of the multi-protocol label switching (MPLS) protocol or the like. Alternatively, the iFIT information may be dispersedly included in, for example, an internet protocol (IP) header based on field information or the like. Each hop of node through which the flow passes reports collected metadata, such as a timestamp and a packet quantity, to a network management device, so that the network management device further calculates a network delay, a packet loss status, a restoration path, and the like based on the reported data. In a point-to-point flow transmission service scenario, an example iFIT information header structure used in an MPLS protocol network is shown in FIG. 1. Key fields in the header structure are described herein.

1. Flow instruction indicator FII field. This field is mainly for identifying that subsequent data information is iFIT packet information. For example, the following field information may be included:

a flow instruction indicator label (FII Label), where a default value may be configured to identify an iFIT detection flow;

an S flag bit, used to indicate whether the label is at the bottom of a stack, for example, a value 1 indicates that the label is at the bottom of a stack, and a value 0 indicates that the label is not at the bottom of a stack; and some related information inherited from an outer MPLS label header, for example, a priority EXP and a time to live (TTL).

2. Flow instruction header FIH field. This field is used to carry information related to iFIT detection. For example, the following field information may be included:

a flow identifier (flow ID), which is a globally unique identifier allocated to each piece of iFIT detection traffic;

an L flag bit, which is a packet loss detection coloring flag, for example, "1" indicates that a packet loss is to be collected, and "0" indicates that no packet loss is to be collected;

a D flag bit, which is a delay measurement coloring flag, for example, "1" indicates that a timestamp is to be collected, and "0" indicates that no timestamp is to be collected;

a header type indicator (HTI), which marks a range of nodes that need to send an iFIT detection result and a range of detection content, for example, different identifiers may be used to distinguish whether detection is to be performed on a path node with an iFIT capability other than nodes at both two ends, whether a flow instruction extension header (FIEH) field is included, and the like; and an R flag bit that may serve as a reserved flag bit.

3. Flow instruction extension header (FIEH) field. This field serves as an extension field and is mainly used to carry other information related to iFIT detection. For example, the following field information may be included:

a flow identifier extension (Flow ID Ext) field, used to extend a bit width of a flow identifier;

a V flag bit, which is a reverse flow flag, for example, "0" indicates that a current flow is a forward flow, and a receive end may automatically create a reverse flow, and "1" indicates that a current flow is a reverse flow, and the receive end does not automatically create a reverse flow; and a period, where different values indicate different detection periods, for example, 1 s, 10 s, 30 s, 1 min, or 10 min.

Usually, the iFIT information is carried in a packet, to indicate a network device to perform iFIT detection. For example, a type of the packet may be a data packet or a control packet. In an actual application scenario, a plurality of data packets or control packets may be continuously sent, for example, a plurality of data packets may constitute a data flow; or a plurality of data packets or control packets, for example, operation, administration and maintenance (OAM) control packets, are sent at intervals within a specific period.

In a network, a detection domain may be specified to determine a network range on which iFIT detection needs to be performed. Usually, a network device in the detection domain needs to transmit iFIT information to implement iFIT detection, and send corresponding information obtained through iFIT detection to a network management device. A detection range of the detection domain may be determined in a plurality of manners. For example, the detection range may be determined based on a network scenario, and a core network part in the network is specified as the detection domain. Alternatively, the detection range may be determined based on a service type. For example, detection domains with different ranges are specified for a video service and a voice service. An iFIT network specifically includes three types of nodes: a head node, an end node, and a hop-by-hop path node. For example, the head node, the end node, and the path node may be corresponding network devices in the network. For a data flow, the $1^{st}$ network device for transmitting the data flow within the specified detection range of the detection domain may serve as a head node for transmitting the data flow. The last network device for transmitting the data flow within the specified detection range of the detection domain may serve as an end node for transmitting the data flow. Each node, between the head node and the end node, for transmitting the data flow is a hop-by-hop path node. The iFIT information may be added by the head node and removed by the end node.

When end-to-end detection is performed on a point-to-point data flow in the network by using the iFIT technology, the head node may determine whether the data flow is within a range of data flows that need to be detected. For example, features of a data flow that needs to be detected may be added to a first access control list (ACL). If the data flow hits an entry in the first ACL and the entry indicates that iFIT detection needs to be performed on the data flow, a corresponding operation is performed on the data flow. The first ACL is used to filter out, according to a specific filtering rule, a data flow that needs to be detected. After a to-be-detected data flow is hit by using the first ACL, the head node may collect and record statistical data, such as packet quantities and timestamps, of the data flow on an ingress port and an egress port, and may add a flow identifier to the recorded statistical data and send the statistical data to a remote network management device. In an actual application scenario, the data flow is usually transmitted by using a group of data packets through grouping. Each of the group of data packets carries a part of data in the data flow. The part of data is carried in a data packet, and constitutes a payload of the data packet. For the determined data flow that needs to be detected, one of the group of data packets that constitute the data flow is used as an example. The head node may encapsulate an extended iFIT header for the data packet. The iFIT header includes a corresponding flow identifier used to uniquely identify the point-to-point data packet. The head node may send the data packet in which the iFIT header is encapsulated, and forward the data packet to each path node and the end node in sequence. The path node and the end node each identify the iFIT header based on an FII field, and determine, based on each field value in the FIH field in the iFIT header, a type of the data packet, whether iFIT information needs to be collected, specific iFIT information that needs to be collected, and the like. In some possible embodiments, the iFIT header may further include an FIEH field. In an example embodiment, after receiving the data packet, the path node reads information about the FIH field in the iFIT header, and collects packet loss and delay data of the device if it is determined that both an L flag bit and a D flag bit in the FIH field are 1. If it is determined that a value of an HTI field is "3", it indicates that the iFIT header further includes information about the FIEH field, and it is required that iFIT detection be performed on all end-to-end nodes through which the data packet passes, including the head node and the end node, provided that the nodes have an iFIT capability. If it is determined that a value of a period flag bit in the FIEH field is "3", that is, a transmission interval is 30 s, the path node periodically sends packet quantity and timestamp data to the network management device at an interval of 30*s*. The path node carries a flow identifier, and sends the collected packet quantity and timestamp data to the network management device. After querying and finding a second ACL, the end node may perform packet quantity and timestamp measurement on a data flow corresponding to the data packet, carry a flow identifier, send measured packet quantity and timestamp data to the network management device, and remove the iFIT header. The second ACL may be different from the first ACL, and is mainly used for data flow filtering and matching, tamper-proof verification, and the like. After collecting packet quantity and timestamp data of an end-to-end and hop-by-hop node through which the data flow passes, the network management device restores a path through which the data flow passes, to complete packet loss and delay calculation and detection for the point-to-point data flow. In some possible embodiments, alternatively, each node may directly send packet loss and delay data to the network management device after local calculation.

In the iFIT header structure shown in FIG. 1, flow identification information used to uniquely identify a flow usually includes two parts: a device identifier nodeID (19 bits), used to uniquely identify a network device in an entire network; and a flow identifier flowID (21 bits), internally allocated by the network device and used to distinguish between different data flows of the same network device. The nodeID and the flowID in the flow identification information include a total of 40 bits, and are placed in a Flow ID (20 bits) field and a Flow ID Ext (20 bits) field in the iFIT header structure. In a scenario of a point-to-point unicast flow, because the flow identification information can uniquely identify a data flow of the network device, iFIT detection on the point-to-point data flow can be implemented. However, in a scenario in which a point-to-multipoint multicast flow is generated, one data flow of one network may be replicated into a plurality of copies on the device, but the plurality of replicated data flows cannot be distinguished only by using the flow identification information. Therefore, the network management device cannot restore a flow path only based on the flow identification information to perform packet loss and delay detection on the corresponding data flow.

Figure 2:
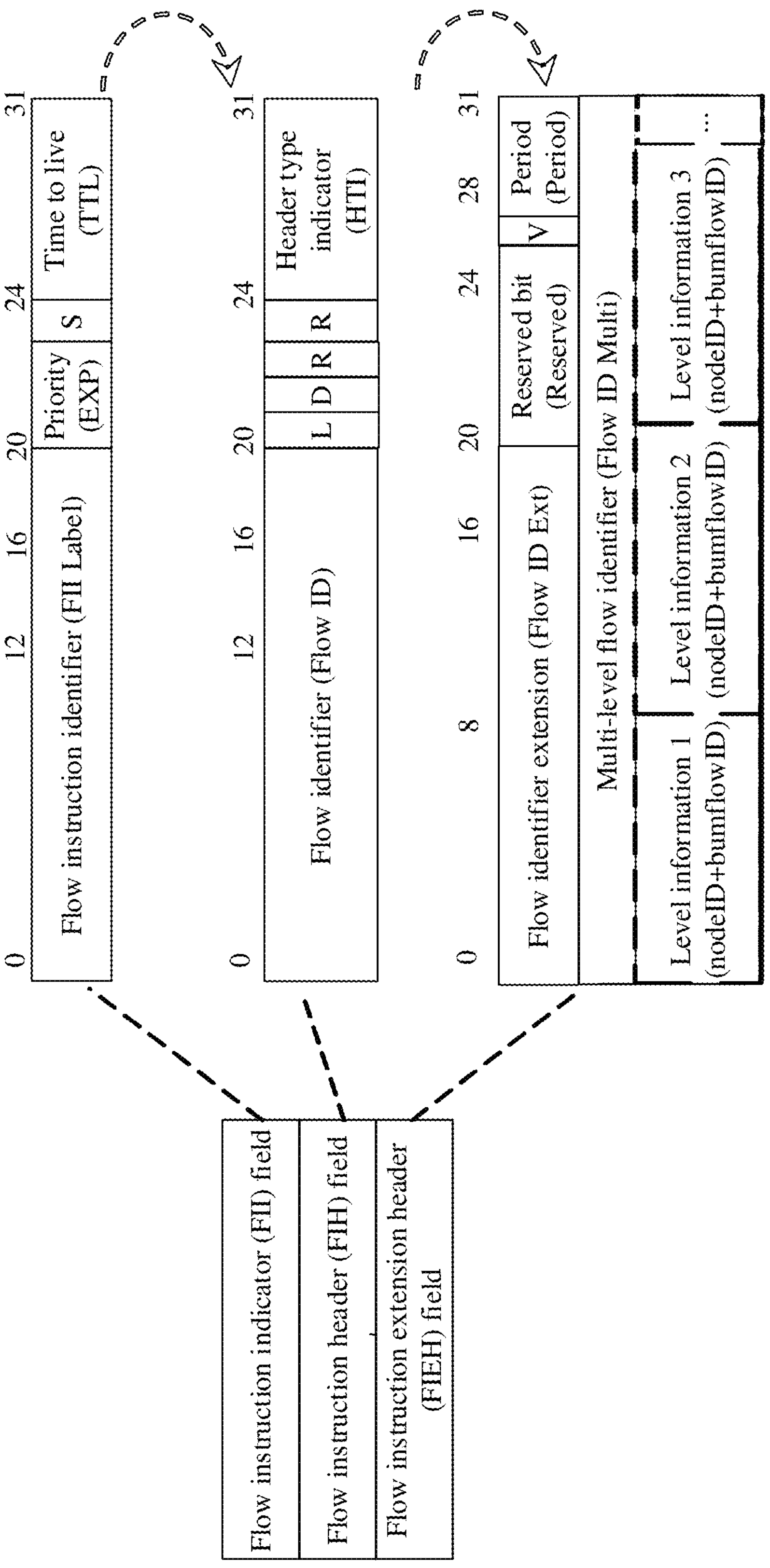
FIG. 2 is a schematic diagram of an example iFIT information header structure according to an embodiment of this application.

FIG. 2 shows an example iFIT header structure according to an embodiment of this application. Extension is performed based on the iFIT header structure shown in FIG. 1 to add a multi-level flow identifier (Flow ID multi) field. The Flow ID multi field is for identifying one or more replications of a point-to-multipoint data flow on a network device through which the data flow passes. In an example embodiment, every 40 bits in the Flow ID multi field constitute one piece of level information. Each time multicast replication is performed on the data flow, a level of 40-bit level information is added to the Flow ID multi field. The level information is assigned by a current node that replicates the data flow. The 40-bit level information includes: a device identifier nodeID (19 bits), for identifying a node that performs data flow replication, where the nodeID is used to uniquely identify the node in the entire network; and a multicast flow identifier bumflowID (21 bits), used to uniquely identify a replicated data flow in the node, where a unique value is assigned to the bumflowID in the node. When the current node replicates the data flow into a plurality of pieces, bumflowIDs of the replicated data flows are different. In this way, each multicast replication of the point-to-multipoint data flow can be uniquely identified through cumulative transfer of all levels of level information in the Flow ID multi field. The Flow ID multi field may be preset to have a specific length based on an empirical value, or may be defined to have a variable length, so that a length of the field can be extended in real time based on an actual application scenario. In an example embodiment, a "tag-length-value" (TLV) encoding structure is used to store and extend the Flow ID multi or the like.

Figure 3:
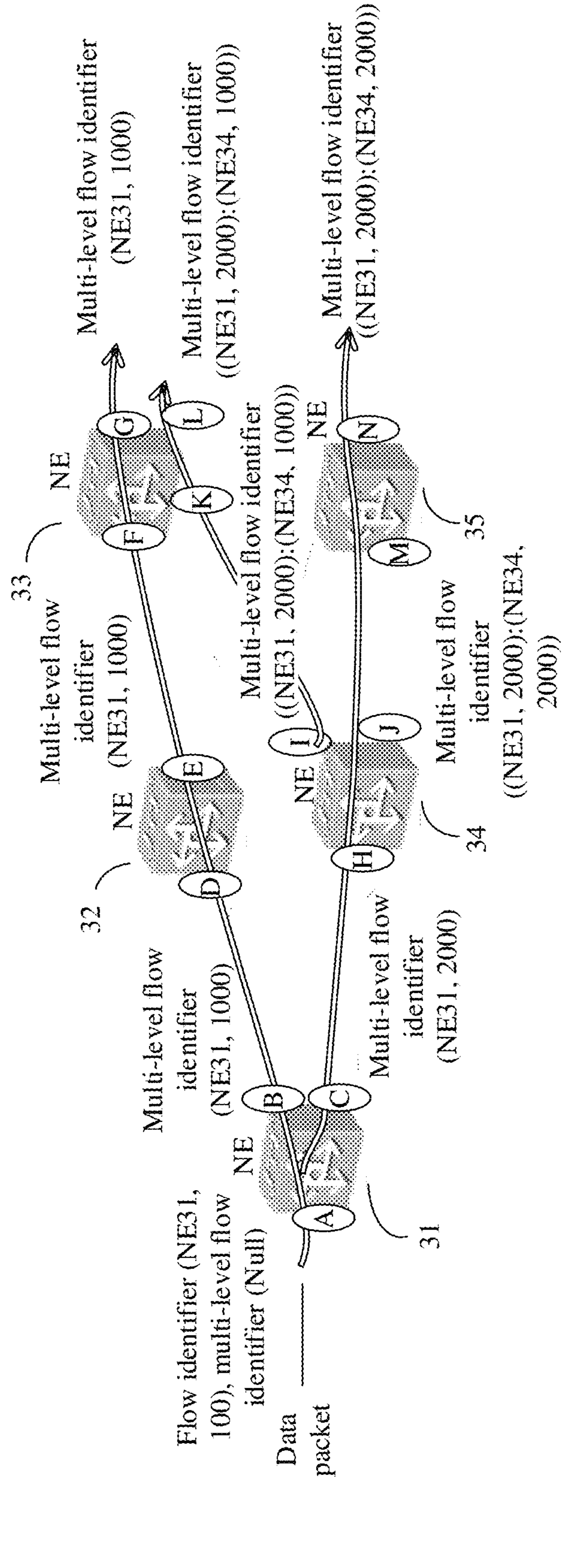
FIG. 3 is a schematic diagram of an example application scenario of a packet processing method according to an embodiment of this application.

Based on the iFIT header structure shown in FIG. 2, FIG. 3 is a schematic diagram of a value of a multi-level flow identifier field for identifying a replicated data flow on each node port when iFIT detection is performed on a point-to-multipoint multicast data flow. Each node shown in FIG. 3 is a network device in a network.

A data packet flows in through an ingress port A of a head node 31. The data packet carries a data payload. A plurality of data payloads in a plurality of data packets may constitute, for example, complete user data. The head node 31 determines that a flow identifier of the data packet on the ingress interface A is (NE31+100). The flow identifier is carried in an iFIT header of each node through which the data packet passes, to identify a data flow corresponding to the data packet (flow identifiers at locations of interfaces other than the interface A of the head node are not shown in FIG. 3). In this case, because the data packet has not been replicated, the value of the multi-level flow identifier (Flow ID multi) field is empty. Multicast replication is performed on the data packet on an egress interface of the head node 31. Data packets generated through replication respectively flow out through egress interfaces B and C of the head node 31. To distinguish between the two data packets generated through replication, the head node 31 adds first-level level information (40 bits) to the multi-level flow identifier (Flow ID multi) field; determines a multi-level flow identifier of a first data packet that flows out through the interface B as (NE31+1000), where NE31 is a nodeID value in the first-level level information, and 1000 is a bumflowID value in the first-level level information; and determines a multi-level flow identifier of a second data packet that flows out through the interface C as (NE31+2000). The replicated first data packet that flows out through the interface B successively passes through a node 32 and a node 33. Because no secondary replication occurs during the process, a multi-level flow identifier of the first data packet that flows out through an egress interface G of the node 33 is still (NE31+1000). The second data packet that flows out through the interface C successively passes through a node 34 and a node 35. The second data packet undergoes secondary replication on the node 34. After the secondary replication, a third data packet and a fourth data packet are generated based on the second data packet, and respectively flow out through egress ports I and J of the node 34. To distinguish between the third data packet and the fourth data packet that respectively flow out through the egress interfaces I and J, the node 34 further adds a level of level information (40 bits), namely, second-level level information, to the multi-level flow identifier (Flow ID multi) field; determines a multi-level flow identifier of the third data packet sent on the interface I as (NE31+2000, NE34+1000); and determines a multi-level flow identifier of the fourth data packet sent on the interface J as (NE31+2000, NE34+2000), to identify that the second data packet is replicated on the node 34. Then the third data packet that flows out through the interface I arrives at the node 33, and the fourth data packet that flows out through the interface J arrives at the node 35. However, no replication is performed on the corresponding node again. Therefore, a multi-level flow identifier of a data packet that flows out through an interface L is the same as that of the data packet that flows out through the port I, that is, (NE31+2000, NE34+1000). Similarly, a multi-level flow identifier of a data packet that flows out through an interface N is the same as that of the data packet that flows out through the port J, that is, (NE31+2000, NE34+2000).

It should be noted that the implementation in which a level of 40-bit level information is added to the multi-level flow identifier (Flow ID multi) each time the data packet is replicated is merely used as an example. In some possible embodiments, another length and composition manner may be alternatively set. For example, each level of level information in the multi-level flow identifier (Flow ID multi) field may be set to 21 bits, and is identified only by a multicast flow identifier bumflowID (21 bits) internally allocated by a node, and a device identifier nodeID (19 bits) for identifying a node is no longer included. When the node sends iFIT detection information, the node may correspondingly send the device identifier (nodeID) of the node to a network management system. In this way, a replicated data flow can also be uniquely determined based on a multi-level flow identifier, thereby saving network bandwidth and improving transmission efficiency. Alternatively, in an example embodiment, in addition to performing identification by using the flow identifier extension (Flow ID Ext) field and the flow identifier (Flow ID) for identifying pre-replication data, the head node may also include a multi-level flow identifier field.

FIG. 4 is a schematic diagram of an example packet structure for sending iFIT detection information to a network management device. The packet structure is applied to the scenario shown in FIG. 3 in which a point-to-multipoint multicast flow is described by using a multi-level flow identifier based on level information. For example, the packet structure may include two parts: flow information and iFIT detection data. The flow information is used to reflect feature information related to a specific multicast flow. Flow identification information and a multi-level flow identifier are used to uniquely identify the specific multicast flow. The multi-level flow identifier includes one or more pieces of level information. The level information is for identifying one or more replications of the data flow. Feature information, such as a flow table direction, source and destination IP addresses, source and destination IP address masks, a source port number, a destination port number, and an index of an ingress port and an index of an egress port of a current node through which the data flow passes, is used by the network management device to restore a path. A flow table type in the flow information may be set to a fixed value, and is used to indicate that a current packet is a packet for sending iFIT detection information. A protocol number is used to determine a type of a protocol followed when the data flow is forwarded. The iFIT detection data is used to record iFIT detection information of the specific multicast flow, and for example, includes a period number, a packet quantity, a byte quantity, and a timestamp. The period number corresponds to a period field value in an iFIT header. Information such as the packet quantity, the byte quantity, and the timestamp is collected and recorded by a network node on a device, and sent to the network management device based on a period specified in the iFIT header.

The network management device may calculate, based on an iFIT detection information packet sent by each network node, packet loss and delay data on a path through which each multicast flow passes, to locate a critical abnormal node and the like. FIG. 3 is used as an example. After receiving iFIT detection information packets, sent by the nodes 33, 34, and 35, at an ingress interface and an egress interface of each of the nodes 33, 34, and 35, the network management device finds that the interfaces I, J, K, and M correspond to same flow identification information (Flow ID+Flow ID Ext), the interface K of the node 33 and the interface I of the node 34 correspond to a same multi-level flow identifier (Flow ID multi) field, that is, (NE31+2000, NE34+1000), the interface K and the interface J of the node 34 correspond to different multi-level flow identifiers (Flow ID multi), and the interface J and the interface M of the node 35 correspond to a same multi-level flow identifier (Flow ID multi) field, that is, (NE31+2000, NE34+2000). Therefore, it can be determined that two multicast flows generated by performing multicast replication on one data flow respectively pass path segments I→K and J→M, so that packet loss and delay data of the two multicast flows on the path segments I→K and J→M can be respectively calculated based on a packet quantity, a byte quantity, and timestamp information in each corresponding iFIT detection information packet. The foregoing is merely an example. In another possible embodiment, packet loss and delay data of a multicast flow on another path segment may be alternatively determined based on level information in a plurality of corresponding multi-level flow identifier fields in a plurality of iFIT detection information packets sent by the nodes. Alternatively, in some cases, based on that all or some of level information in a plurality of multi-level flow identifiers is the same, the network management device can restore an end-to-end transmission path of a specific multicast flow, and determine a packet loss and a delay on the end-to-end transmission path.

FIG. 4 shows only an example possible structure of a packet sent to the network management device according to an embodiment of this application. In some embodiments, another packet structure may be alternatively defined with reference to an actual scenario. For example, when packet loss and delay data can be obtained by using a local calculation capability of a node, a packet quantity and a timestamp in iFIT detection data may be replaced with a quantity of lost packets and a delay; or an error information field may be added to the iFIT detection data, to indicate that currently sent iFIT collected data is unreliable.

In the foregoing solution in which level information is introduced into the newly added multi-level flow identifier (Flow ID multi) field to mark and distinguish between multicast flows, iFIT detection on a replicated multicast flow in a point-to-multipoint scenario can be implemented. However, in an actual application scenario, due to impact of factors such as a network scale, a multicast flow may pass through a large quantity of network nodes in a network. In a manner of identifying multicast flows by using different level information in the Flow ID multi, when the data flow is replicated many times, because a cumulative amount of level information is large, a length of the Flow ID multi field may greatly increase, and therefore a bandwidth loss and a possibility of a data packet loss increase.

Figure 5:
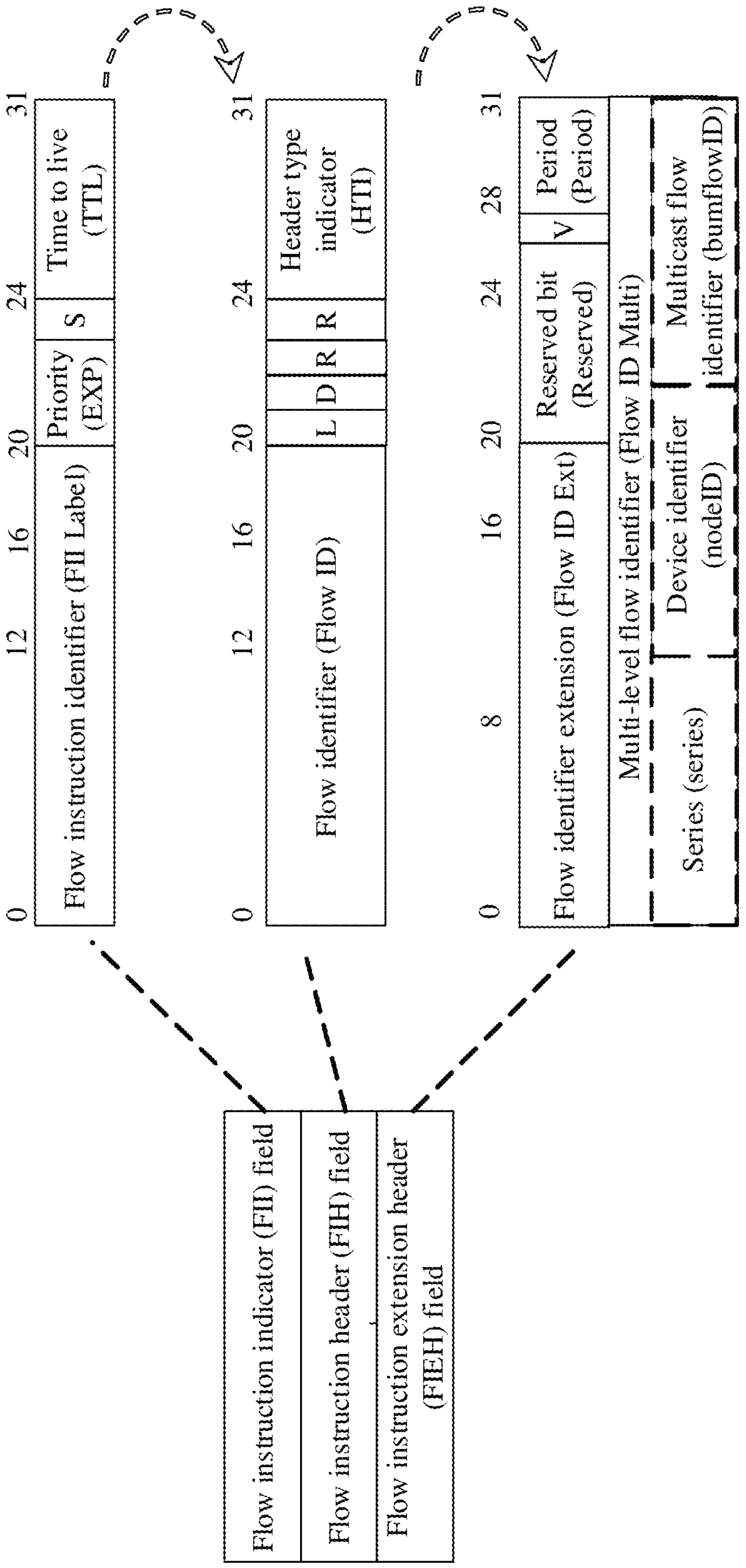
FIG. 5 is a schematic diagram of another example iFIT information header structure according to an embodiment of this application.

To avoid the foregoing problem, another embodiment of this application provides an example iFIT header structure, as shown in FIG. 5. Extension is performed based on the iFIT header structure shown in FIG. 1 to add a multi-level flow identifier (Flow ID multi) field. The Flow ID multi field is for identifying one or more replications of a point-to-multipoint data flow on a node through which the data flow passes. In another possible example, each replication of the data flow is no longer marked or distinguished only by using the level information, but three types of subfield information are added to the multi-level flow identifier (Flow ID multi) field: a series (8 bits), a device identifier nodeID (19 bits), and a multicast flow identifier bumflowID (21 bits). Each time multicast replication is performed on the data flow, the series is incremented by one level. For example, the being incremented by one level may be that a value is incremented by 1, or that a change is performed according to a preset rule. The device identifier nodeID is for identifying a node that performs data flow replication. The multicast flow identifier bumflowID (21 bits) is used to uniquely identify a replicated data flow in the node, and bumflowIDs of replicated data flows are different. In this embodiment, the series subfield information is introduced, and level information generated in each replication of the data flow no longer needs to be transferred cumulatively. The multi-level flow identifier (Flow ID multi) field occupies a same quantity of bytes on each node. However, different series may be assigned to different node locations based on different quantities of data flow replications. In addition, a path through which a multicast data flow passes may be directly restored by using a series and other field information. This greatly saves bandwidth resources, and improves communication efficiency and accuracy.

Figure 6:
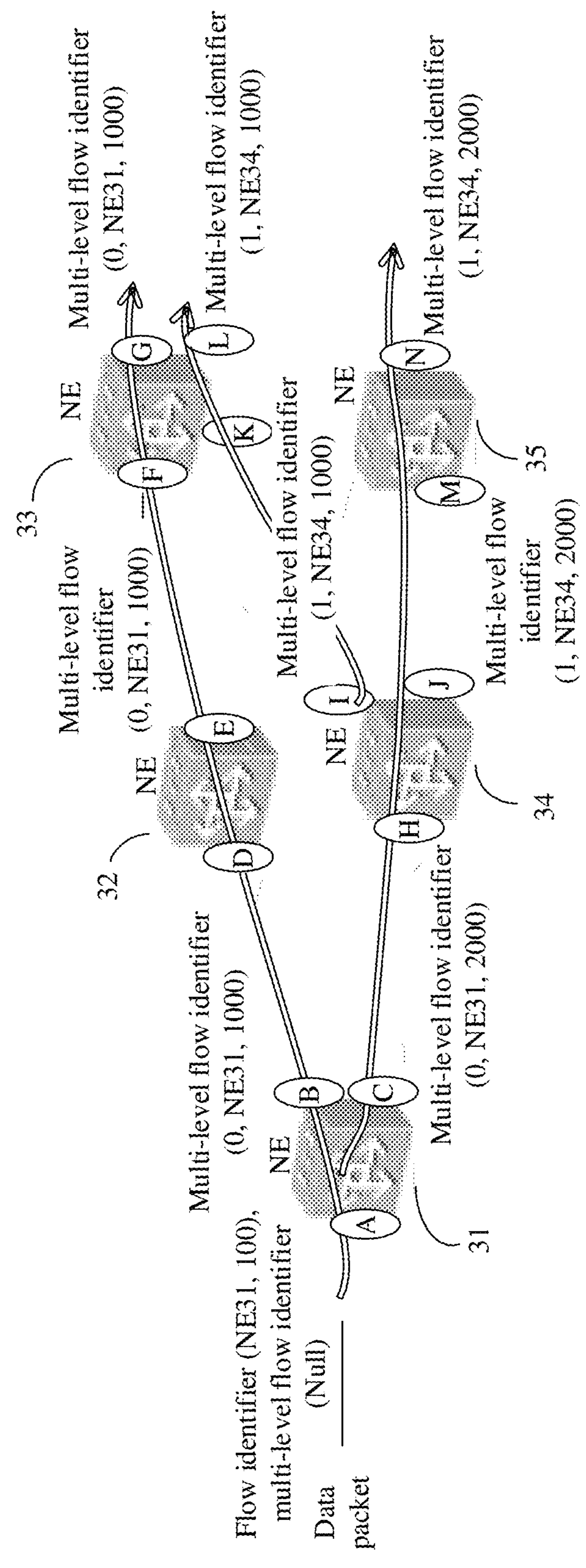
FIG. 6 is a schematic diagram of an example application scenario of another packet processing method according to an embodiment of this application.

Based on the iFIT header structure shown in FIG. 5, FIG. 6 is a schematic diagram of a value of a multi-level flow identifier field for identifying a replicated data flow on each node port when iFIT detection is performed on a point-to-multipoint data flow. Each node shown in FIG. 6 is a network device in a network.

A data packet flows in through an ingress port A of a head node 31. The data packet carries a data payload. A plurality of data payloads in a plurality of data packets may constitute, for example, complete user data. The head node 31 determines that a flow identifier of the data packet is (NE31+100). The flow identifier is carried in an iFIT header of each node through which the data packet passes, to identify a data flow corresponding to the data packet (flow identifiers at locations of interfaces other than the interface A of the head node are not shown in FIG. 6). In this case, because the data packet has not been replicated, the value of the multi-level flow identifier (Flow ID multi) field is empty. Multicast replication is performed on the data packet on an egress interface of the head node 31. A first data packet and a second data packet that are generated through replication respectively flow out through egress interfaces B and C of the head node 31. To distinguish between the two data packets generated through replication, the head node 31 distinguishes between and marks the first data packet and the second data packet in the multi-level flow identifier (Flow ID multi) field by using a bumflowID subfield; determines a bumflowID of the first data packet that flows out through the interface B as 1000, determines a bumflowID of the second data packet that flows out through the interface C as 2000, and determines series of both the first data packet and the second data packet as 0, to indicate the 1st replication of a data flow. In this way, a multi-level flow identifier of the first data packet that flows out through the interface B is determined as (0, NE31, 1000), and a multi-level flow identifier of the second data packet that flows out through the interface C is determined as (0, NE31, 2000). The first data packet that flows out through the interface B successively passes through a node 32 and a node 33. Because no secondary replication occurs during the process, a multi-level flow identifier of a data packet that flows out through an egress interface G of the node 33 is still (0, NE31, 1000). The second data packet that flows out through the interface C successively passes through a node 34 and a node 35. The second data packet undergoes secondary replication on the node 34. A third data packet and a fourth data packet that are generated through the secondary replication respectively flow out through egress interfaces I and J of the node 34. To distinguish between the data packets that respectively flow out through the egress interfaces I and J, the node 34 distinguishes between and marks, by using a bumflowID subfield in a multi-level flow identifier (Flow ID multi) field, the third data packet and the fourth data packet that are generated through the secondary replication; determines a bumflowID of the third data packet sent on the interface I as 1000; and determines a bumflowID of the fourth data packet sent on the interface J as 2000, to identify that the data flow is replicated on the node 34. It should be noted that, because it only needs to be ensured that a value of the bumflowID is unique within a node, a value of the bumflowID on the egress interface B of the node 31 and a value of the bumflowID on the egress interface I of the node 34 shown in FIG. 6 are both 1000. However, in another possible embodiment, the bumflowID on the interface B may be alternatively different from that on the interface I. The node 34 increments series on the interfaces I and J by 1, and determines both series as 1, to indicate the $2^{nd}$ replication of the data flow. It should be noted that, although values of first-level series at the interfaces B and C shown in FIG. 6 are 0, the values may alternatively start from 1 or any appropriate numerical value in practice, and may be changed according to a preset rule to mark another replication of traffic at a subsequent node location. In this way, a multi-level flow identifier of the third data packet that flows out through the interface I is determined as (1, NE34, 1000), and a multi-level flow identifier of the fourth data packet that flows out through the interface J is determined as (1, NE34, 2000). Then the third data packet that flows out through the interface I arrives at the node 33, and the fourth data packet that flows out through the interface J arrives at the node 35. However, no replication is performed on the corresponding node again. Therefore, a multi-level flow identifier of a data packet that flows out through an interface L is the same as that of the data packet that flows out through the interface I, that is, (1, NE34, 1000). Similarly, a multi-level flow identifier of a data packet that flows out through an interface N is the same as that of the data packet that flows out through the interface J, that is, (1, NE34, 2000).

It should be noted that the implementation of the three fields in the multi-level flow identifier field is merely used as an example. In some possible embodiments, another appropriate length and composition manner may be alternatively set. For example, fewer bits, specifically, 17 bits, may be alternatively set for the bumflowID in the multi-level flow identifier (Flow ID multi) field with reference to an actual scenario. Alternatively, the multi-level flow identifier field includes only a series and a multicast flow identifier, but does not include a device identifier of a node. For example, the device identifier may be carried as a flow information field when the node sends the iFIT detection message, and sent to the network management device, to further save network bandwidth and improve transmission efficiency.

FIG. 7 is a schematic diagram of an example packet structure for sending iFIT detection information to a network management device. The packet structure is applied to the scenario shown in FIG. 6 in which point-to-multipoint multicast replicated traffic is described by using a multi-level flow identifier based on a series. For example, the packet structure may include two parts: flow information and iFIT detection data. For specific meanings of related information, refer to corresponding descriptions in FIG. 4. A difference from the packet structure shown in FIG. 4 mainly lies in information content specifically included in a multi-level flow identifier. Corresponding to the iFIT header structure shown in FIG. 5, multi-level flow identification information shown in FIG. 7 that is sent to the network management device also specifically includes a series, a device identifier, and multicast flow identification information. In some cases, the network management device can restore an end-to-end transmission path of a specific multicast flow based on multi-level flow identifiers sent by a plurality of interfaces, and determines a packet loss and a delay on the end-to-end transmission path.

Figure 8:
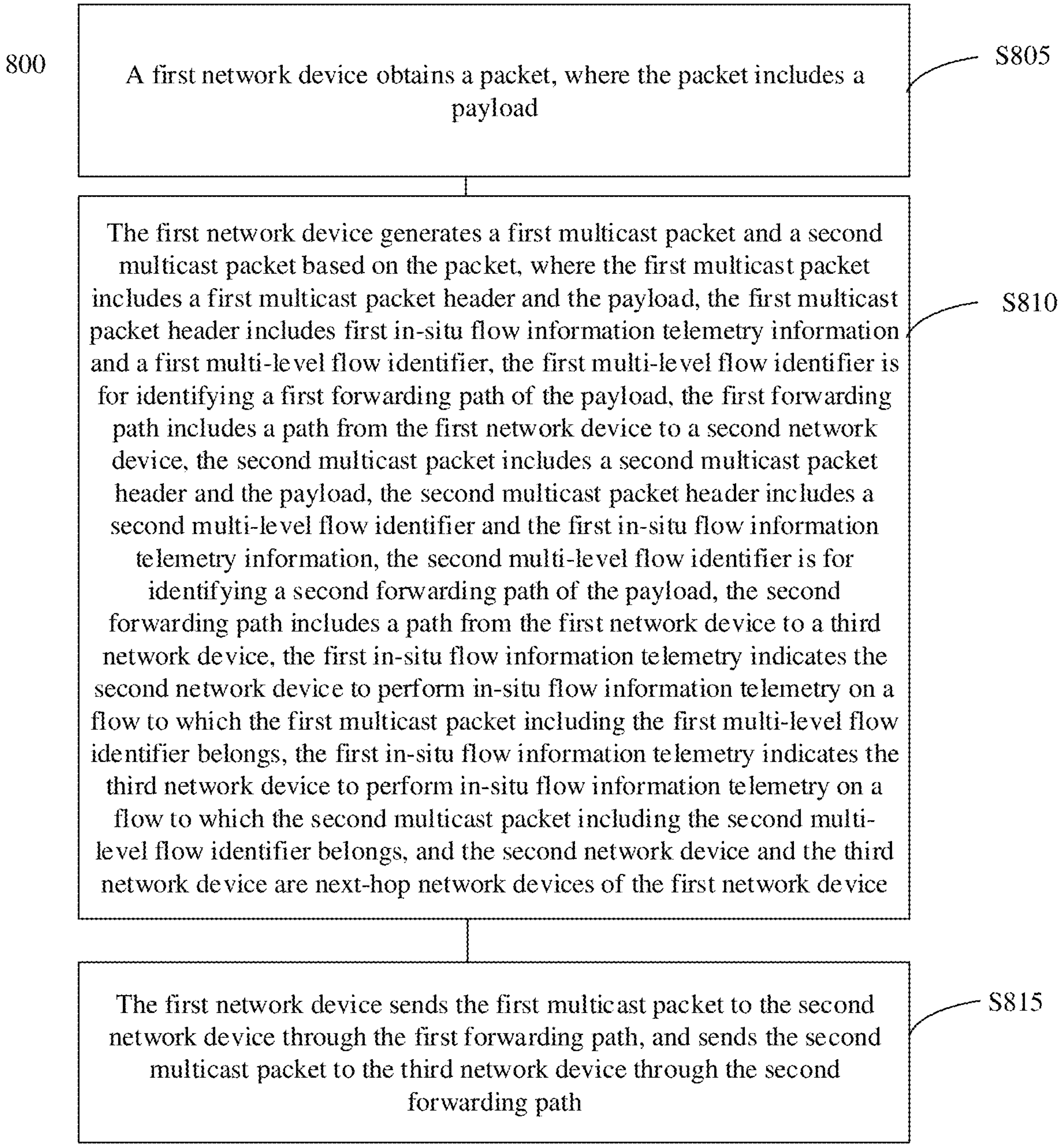
FIG. 8 is a schematic flowchart of an example multicast packet processing method according to an embodiment of this application.

FIG. 8 shows a multicast packet processing method 800 according to an embodiment of this application. By performing the method 800, iFIT detection can be performed in a point-to-multipoint multicast flow transmission scenario or the like, so that a network management device implements path restoration, packet loss and delay statistics, and the like for a plurality of multicast flows based on detection information of the iFIT detection. The method 800 includes the following steps.

S805: A first network device obtains a packet, where the packet includes a payload.

FIG. 3 is used as an example. When the first network device is the head node 31 and obtains a data packet, for example, the obtaining the data packet may be receiving, by the head node 31, a data packet beyond an iFIT detection domain. The data packet may be a unicast packet or a multicast packet. The unicast packet or the multicast packet includes a payload. Alternatively, the head node 31 may serve as the 1$^{st}$ node for transmitting the data packet in the network, and the head node 31 itself generates the data packet including the payload. In this case, the head node 31 adds iFIT information to the data packet. In some cases, for example, the data packet is not replicated on the head node 31, and therefore a multi-level flow identifier field or information may not be added. In some other cases, although the data packet is not replicated on the head node 31, the head node 31 may generate a multi-level flow identifier field for the data packet, but a field value is empty. In some other cases, for example, if the data packet is replicated on the head node 31, the head node 31 further adds a corresponding multi-level flow identifier to each of two data packets generated by replicating the payload in the data packet.

When the first network device is a path node, for example, the path node 34 may receive the data packet that includes the payload and that is sent by the head node 31 through the egress interface C, the data packet sent by the head node 31 includes iFIT information and a multi-level flow identifier (NE31, 2000). The multi-level flow identifier (NE31, 2000) is used to uniquely identify the data packet sent through the egress interface C after replication is performed on the head node 31. The ingress interface H of the path node 34 receives the data packet including the multi-level flow identifier (NE31, 2000). The path node 34 determines whether replication needs to be performed after the data packet is received. If replication does not need to be performed, the path node 34 may directly send the received data packet to a next forwarding node or a receiving node without any modifications on the received multi-level flow identifier (NE31, 2000).

S810: The first network device generates a first multicast packet and a second multicast packet based on the packet. The first multicast packet includes a first multicast packet header and the payload. The first multicast packet header includes first in-situ flow information telemetry information and a first multi-level flow identifier. The first multi-level flow identifier is for identifying a first forwarding path of the payload. The first forwarding path includes a path from the first network device to a second network device. The second multicast packet includes a second multicast packet header and the payload. The second multicast packet header includes a second multi-level flow identifier and the first in-situ flow information telemetry information. The second multi-level flow identifier is for identifying a second forwarding path of the payload. The second forwarding path includes a path from the first network device to a third network device. The first in-situ flow information telemetry information indicates the second network device to perform in-situ flow information telemetry on a flow to which the first multicast packet including the first multi-level flow identifier belongs. The first in-situ flow information telemetry information indicates the third network device to perform in-situ flow information telemetry on a flow to which the second multicast packet including the second multi-level flow identifier belongs. The second network device and the third network device are next-hop network devices of the first network device.

If the received data packet is replicated on the path node 34, and a first multicast packet and a second multicast packet are generated through replication, the first multicast packet and the second multicast packet that are generated through replication respectively flow out through the egress interfaces I and J. To distinguish between the first multicast packet and the second multicast packet that are generated through replication and that respectively flow out through the egress interfaces I and J, the path node 34 separately generates a first multi-level flow identifier ((NE31, 2000):(NE34, 1000)) of the first multicast packet and a second multi-level flow identifier ((NE31, 2000):(NE34, 2000)) of the second multicast packet based on the multi-level flow identifier of the data packet on the head node 31. The first multi-level flow identifier is different from the second multi-level flow identifier, to distinguish between the first multicast packet that flows out through the egress interface I and the second multicast packet that flows out through the egress interface J. The first multicast packet and the second multicast packet pass through different paths after being sent by the node 34. Specifically, the first multi-level flow identifier ((NE31, 2000):(NE34, 1000)) may identify a first forwarding path that is used after the packet flows out through the egress interface I and before the packet is replicated next time. The first forwarding path includes at least a path I→K. The second multi-level flow identifier ((NE31, 2000):(NE34, 2000)) may identify a second forwarding path that is used after the packet flows out through the egress interface J and before the packet is replicated next time. The second forwarding path includes at least a path J→M.

S815: The first network device sends the first multicast packet to the second network device through the first forwarding path, and sends the second multicast packet to the third network device through the second forwarding path.

The first multicast packet that flows out through the egress interface I passes through the path I→K, and is received by node 33. The second multicast packet that flows out through the egress interface J passes through the path J→M, and is received by the node 35.

In an example embodiment, the multi-level flow identifier in the data packet sent by the head node 31 includes one or more pieces of level information, and each piece of level information includes a network device identifier and a multicast flow identifier. In S815, that the network device generates the first multi-level flow identifier and the second multi-level flow identifier based on the multi-level flow identifier of the head node 31 specifically includes: The network device adds one piece of level information based on the multi-level flow identifier of the head node 31 to generate each of the first multi-level flow identifier and the second multi-level flow identifier. The first multi-level flow identifier and the second multi-level flow identifier include a same network device identifier, which is for identifying the node 34 that generates the first multicast packet and the second multicast packet through replication. The first multi-level flow identifier and the second multi-level flow identifier include different multicast flow identifiers, which are used to uniquely identify, in the node 34, the first multicast packet and the second multicast packet that are generated through replication. Specifically, the path node 34 receives the data packet that includes the payload and the multi-level flow identifier and that is sent by the head node 31 through the egress interface C. The multi-level flow identifier of the data packet includes one piece of level information. The level information includes a network device identifier NE31 and a multicast flow identifier 2000. The path node 34 replicates the data packet to generate the first multicast packet and the second multicast packet, and sends the first multicast packet and the second multicast packet through the egress interfaces I and J respectively. The path node 34 generates, based on the replication behavior, the first multi-level flow identifier corresponding to the first multicast packet, and the second multi-level flow identifier corresponding to the second multicast packet. For the first multicast packet sent through the egress interface I, the path node 34 adds one level of level information based on the multi-level flow identifier of the head node 31. The added level information includes an identifier NE34 of a network device that performs a corresponding replication behavior, and a multicast flow identifier 1000. Therefore, the first multi-level flow identifier of the first multicast packet sent through the interface I is determined as ((NE31, 2000):(NE34, 1000)). For the first multicast packet sent through the egress interface I, the path node 34 adds one level of level information based on the multi-level flow identifier of the head node 31. The added level information includes an identifier NE34 of a network device that performs a corresponding replication behavior, and a multicast flow identifier 2000. Because the replication behavior also occurs on the path node 34, the network device identifier in the level information is also NE34. However, because the multicast flow identifier (2000) is different from the multicast flow identifier (1000) of the second data flow sent through the egress interface I, the second multi-level flow identifier of the second multicast packet sent through the egress interface J is determined as ((NE31, 2000):(NE34, 1000)). In this way, the first multicast packet and the second multicast packet that are generated through replication are distinguished.

In an example embodiment, the level information includes only a multicast flow identifier. The multicast flow identifier varies in a plurality of multicast packets generated by one network device, to distinguish between and identify a plurality of different multicast packets generated through replication on one network device, so that bandwidth can be saved. However, in this case, multicast flow identifiers allocated by different network devices may be the same or different. When multicast flow identifiers allocated by different network devices are the same, for example, each network device may add a network device identifier of the network device to a message to be sent to the network management device, to distinguish between same multicast flow identifiers from different network devices.

In another embodiment, the first multi-level flow identifier includes a first series, a first network device identifier, and a first multicast flow identifier, and the second multi-level flow identifier includes a second series, a second network device identifier, and a second multicast flow identifier. A specific operation of S815 includes: The first network device generates, based on a series of the multi-level flow identifier in the data packet, a first series of the first multicast flow identifier and the second multicast flow identifier that are generated through replication. The first series is different from the series of the multi-level flow identifier in the data packet. The first multicast flow identifier and the second multicast flow identifier include a same network device identifier, which is for identifying the network device that generates a plurality of multicast packets through replication. The first multicast flow identifier and the second multicast flow identifier include different multicast flow identifiers, which are used to uniquely identify, on the first network device, each multicast packet generated by replicating the payload. FIG. 6 is used as an example. The path node 34 that serves as a network device receives the data packet that includes the payload and the multi-level flow identifier and that is sent by the head node 31 through the egress interface C. The multi-level flow identifier of the data packet includes a series 0, a network device identifier NE31, and a multicast flow identifier 2000. The path node 34 replicates the data packet to generate the first multicast packet that includes the first multi-level flow identifier, and the second multicast packet that includes the second multi-level flow identifier, and sends the first multicast packet and the second multicast packet through the egress interfaces I and J respectively. The path node 34 updates the first multi-level flow identifier and the second multi-level flow identifier based on the replication behavior. For the first multicast packet sent through the interface I, the path node 34 updates the first series of the first multi-level flow identifier to 1 based on the series of the multi-level flow identifier of the head node 31, so that the first series (1) of the first multi-level flow identifier is different from the series (0) of the multi-level flow identifier of the head node 31. Similarly, the path node 34 also updates the first series of the second multi-level flow identifier to 1 based on the series of the multi-level flow identifier of the head node 31. The first multi-level flow identifier and the second multi-level flow identifier include a same network device identifier: NE34. The first multi-level flow identifier and the second multi-level flow identifier include different multicast flow identifiers. A multicast flow identifier of the first multicast packet that flows out through the egress interface I is 1000. A multicast flow identifier of the second multicast packet that flows out through the egress interface J is 2000. Therefore, the first multi-level flow identifier of the first multicast packet sent through the egress interface I is determined as (1, NE34, 1000), and the second multi-level flow identifier of the second multicast packet sent through the egress interface J is determined as (1, NE34, 2000). It should be noted that, when multicast flow identifiers are allocated to a plurality of multicast packets generated through replication based on a same data packet, it only needs to be ensured that the multicast flow identifiers are not duplicate one a same network device, and multicast flow identifiers allocated by different network devices may be the same or different.

In some example embodiments, the method 800 further includes the following content:

S825: The first network device sends a first message and a second message to the network management device. The first message carries the first multi-level flow identifier of the first multicast packet and first information. The first information is information determined by the first network device based on the first iFIT information in the first multicast packet. The second message carries the second multi-level flow identifier of the second multicast packet and second information. The second information is information determined by the first network device based on the first iFIT information in the second multicast packet.

The first network device may send one or more messages to the network management device, to send iFIT detection data of each interface on the first network device. The node 34 is still used as an example. For a first data flow and a second data flow respectively corresponding to the first multicast packet and the second multicast packet that are generated by the node 34 through replication, the first network device respectively sends a first message and a second message to the network management device. The first message is used to carry iFIT detection data of the first data flow. For example, in a solution of implementing a multi-level flow identifier based on a series, the first message includes the ingress interface H, the egress interface I, and the first multi-level flow identifier (1, NE34, 1000) of the first multicast packet, and the second message includes the ingress interface H, the egress interface J, and the second multi-level flow identifier (1, NE34, 2000) of the second multicast packet.

Figure 9:
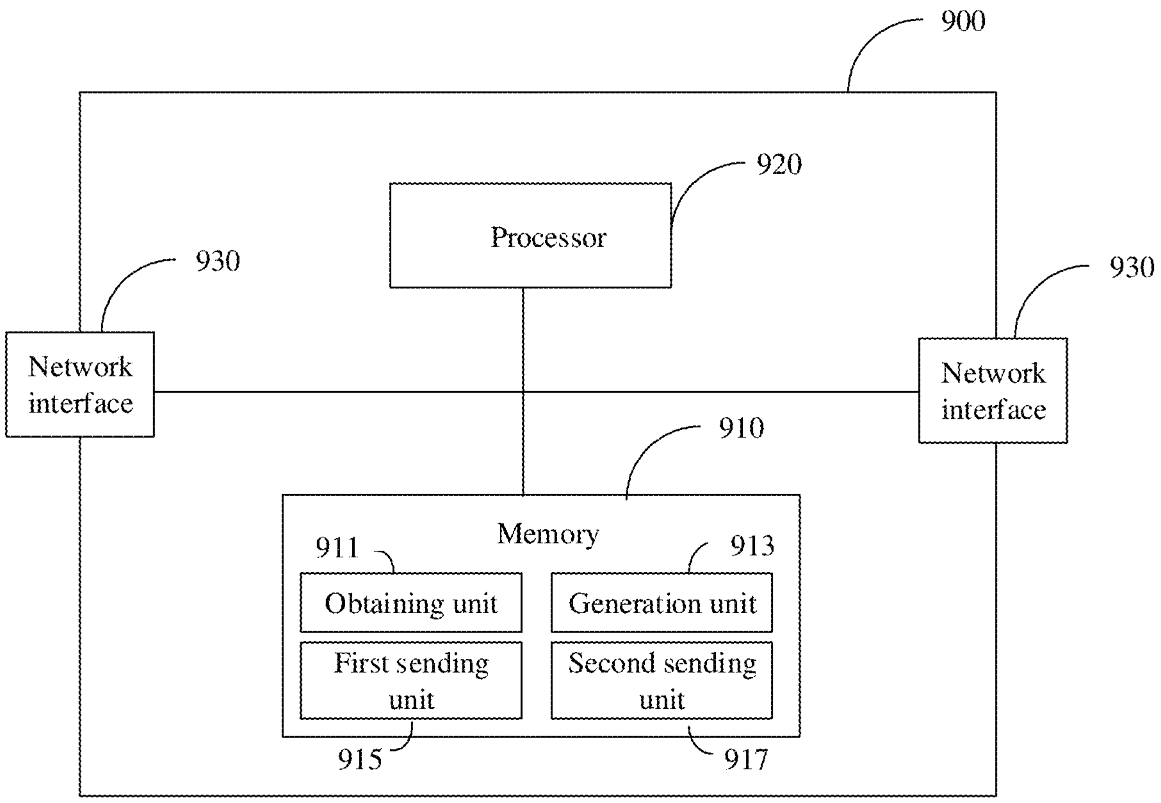
FIG. 9 is a schematic diagram of an example structure of a network device according to an embodiment of this application.

An embodiment of this application further provides a network device 900, for example, the network node 31, 32, 33, 34, or 35 shown in FIG. 3 or FIG. 6. The device 900 includes a memory 910, a processor 920, and a network interface 930, as shown in FIG. 9. The network interface 930 is configured to receive data from a network and/or send, to the network, data that needs to be sent by a network management system. The network interface 930 may send, to the memory 910 and the processor 920, the data received from the network, and may also send, to the network, data processed or generated by the processor 920. For example, the data may be a packet carrying a payload that needs to be forwarded. The memory 910 is configured to store computer-readable instructions. The processor 920 is configured to execute the computer-readable instructions stored in the memory 910, so that the device 900 performs, for example, the method 800 by using, for example, the iFIT information interfaces shown in FIG. 2 and FIG. 5. For specific execution content and implemented functions, refer to the foregoing descriptions related to data structures and execution methods. In an example, when the device 900 performs the method 800, the computer-readable instructions in the memory 910 may include an obtaining unit 911, a generation unit 913, a first sending unit 915, and a second sending unit 917.

An embodiment of this application further provides a computer-readable storage medium or a computer program product, configured to store a corresponding computer program. The computer program is used to perform the method 800.

It should be understood that in this embodiment of this application, a processor may be a central processing unit (CPU), one or more network processors (NP), or a combination of a CPU and an NP. The processor may be alternatively one or more programmable logic devices (PLD) or a combination thereof. The PLD may be a complex programmable logic device (CPLD), a field-programmable gate array (FPGA), generic array logic (GAL), or any combination thereof.

A memory may be one memory, or may include a plurality of memories. The memory includes a volatile memory, such as a random access memory (RAM). The memory may further include a non-volatile memory, such as a read-only memory (ROM), a flash memory, a hard disk drive (HDD), or a solid-state drive (SSD). The memory may further include a combination of the foregoing types of memories.

A network interface may be an Ethernet network interface, or may be another type of network interface.

It may be understood that a structural composition of the network configuration device 900 is merely an example. In an actual application, the device 900 may include any quantity of interfaces, processors, memories, and the like.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in this specification, modules and method steps may be implemented by electronic hardware, or a combination of computer software and electronic hardware. Whether the functions are performed by hardware or software depends on particular applications and design constraint conditions of the technical solutions. A person skilled in the art can implement the described functions by using different methods with regard to each specific application.

All or some of the foregoing embodiments may be implemented by using software, hardware, firmware, or any combination thereof. When software or firmware is used to implement the embodiments, all or some of embodiments may be implemented in a form of a computer program product. The computer program product includes one or more computer instructions. When the computer program instructions are loaded and executed on a computer, all or some of the procedures or the functions according to embodiments of this application are generated. The computer may be a general purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a twisted pair) or wireless (for example, infrared, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, an optical disc), a semiconductor medium (for example, a solid-state drive), or the like. All parts in this specification are described in a progressive manner, and for same or similar parts in the embodiments, refer to these embodiments. Especially, a device embodiment is basically similar to a method embodiment, and therefore is described briefly; for related parts, refer to descriptions in the method embodiment.

In summary, it should be noted that what is described above is merely example embodiments of the technical solutions of this application, but is not intended to limit the protection scope of this application.

What is claimed is:

1. A multicast packet processing method, comprising:

obtaining, by a first network device, a packet comprising a payload;

obtaining, by the first network device, a first multicast packet and a second multicast packet based on the packet, wherein the first multicast packet comprises a first multicast packet header and the payload, the first multicast packet header comprises first in-situ flow information telemetry information and a first multi-level flow identifier identifying a first forwarding path of the payload, the first forwarding path comprises a path from the first network device to a second network device, the second network device being a downstream device of the first network device, the second multicast packet comprises a second multicast packet header and the payload, the second multicast packet header comprises a second multi-level flow identifier and the first in-situ flow information telemetry information, the second multi-level flow identifier identifies a second forwarding path of the payload, the second forwarding path comprises a path from the first network device to a third network device, the third network device being a downstream device of the first network device, the first in-situ flow information telemetry information indicates performing in-situ flow information telemetry; and sending, by the first network device, the first multicast packet to the second network device via the first forwarding path, and sending the second multicast packet to the third network device via the second forwarding path.

2. The method according to claim 1, wherein the obtaining, by the first network device, a first multicast packet and a second multicast packet based on the packet comprises:

obtaining, by the first network device, the first multi-level flow identifier, wherein the first multi-level flow identifier comprises first level information, the first level information identifies a path that corresponds to the payload and that is from the first network device to the second network device, the first level information comprises a first multicast flow identifier identifying a multicast data flow to which the first multicast packet belongs; and obtaining, by the first network device, the second multi-level flow identifier, wherein the second multi-level flow identifier comprises second level information identifying a path that corresponds to the payload and that is from the first network device to the third network device, the second level information comprises a second multicast flow identifier identifying a flow to which the second multicast packet belongs, and the second multicast flow identifier is different from the first multicast flow identifier.

3. The method according to claim 2, wherein the first level information and the second level information further comprise a first device identifier identifying the first network device.

4. The method according to claim 2, wherein the packet is a third multicast packet, the third multicast packet comprises a third multicast packet header and the payload, the third multicast packet header comprises the first in-situ flow information telemetry information and a third multi-level flow identifier, the third multi-level flow identifier comprises third level information identifying a path that corresponds to the payload and that is from a fourth network device to a fifth network device, the fifth network device is a downstream device of the fourth network device, the third level information comprises a third multicast flow identifier identifying a flow to which the third multicast packet belongs, and the first multi-level flow identifier and the second multi-level flow identifier each further comprises the third level information.

5. The method according to claim 1, wherein the obtaining, by the first network device, a first multicast packet and a second multicast packet based on the packet specifically comprises:

obtaining, by the first network device, the first multi-level flow identifier, wherein the first multi-level flow identifier comprises first series information and a first multicast flow identifier, the first series information identifies obtaining the first multicast packet and the second multicast packet based on the packet, and the first multicast flow identifier identifies a multicast data flow to which the first multicast packet belongs; and obtaining, by the first network device, the second multi-level flow identifier, wherein the second multi-level flow identifier comprises the first series information and a second multicast flow identifier identifying a multicast data flow to which the second multicast packet belongs, and the second multicast flow identifier is different from the first multicast flow identifier.

6. The method according to claim 5, wherein the first multi-level flow identifier and the second multi-level flow identifier further comprise a first device identifier identifying the first network device.

7. The method according to claim 5, wherein the packet is a third multicast packet, the third multicast packet comprises a third multicast packet header and the payload, the third multicast packet header comprises the first in-situ flow information telemetry information and a third multi-level flow identifier, the third multi-level flow identifier comprises second series information and a third multicast flow identifier, and the third multicast flow identifier identifies a multicast data flow to which the third multicast packet belongs; and the obtaining, by the first network device, a first multicast packet and a second multicast packet based on the packet further comprises: obtaining, by the first network device, the first series information based on the second series information of the third multi-level flow identifier of the packet.

8. The method according to claim 1, further comprising:

sending, by the first network device, a first message and a second message to a network management device, wherein the first message carries the first multi-level flow identifier of the first multicast packet and first information, the first information is determined by the first network device based on the first in-situ flow information telemetry information in the first multicast packet, the second message carries the second multi-level flow identifier of the second multicast packet and second information, and the second information is determined by the first network device based on the first in-situ flow information telemetry information in the second multicast packet.

9. A first network device, comprising:

at least one processor;

a memory coupled to the at least one processor and storing instructions that, when executed by the at least one processor, cause the first network device to:

obtain a packet comprising a payload;

obtain a first multicast packet and a second multicast packet based on the packet, wherein the first multicast packet comprises a first multicast packet header and the payload, the first multicast packet header comprises first in-situ flow information telemetry information and a first multi-level flow identifier identifying a first forwarding path of the payload, the first forwarding path comprises a path from the first network device to a second network device, the second network device being a downstream device of the first network device, the second multicast packet comprises a second multicast packet header and the payload, the second multicast packet header comprises a second multi-level flow identifier and the first in-situ flow information telemetry information, the second multi-level flow identifier identifies a second forwarding path of the payload, the second forwarding path comprises a path from the first network device to a third network device, the third network device being a downstream device of the first network device, the first in-situ flow information telemetry information indicates performing in-situ flow information telemetry; and send the first multicast packet to the second network device via the first forwarding path, and send the second multicast packet to the third network device via the second forwarding path.

10. The first network device according to claim 9, wherein the instructions, when executed by the at least one processor, further cause the first network device to:

obtain the first multi-level flow identifier, wherein the first multi-level flow identifier comprises first level information identifying a path that corresponds to the payload and that is from the first network device to the second network device, the first level information comprises a first multicast flow identifier identifying a multicast data flow to which the first multicast packet belongs; and obtain the second multi-level flow identifier, wherein the second multi-level flow identifier comprises second level information identifying a path that corresponds to the payload and that is from the first network device to the third network device, the second level information comprises a second multicast flow identifier identifying a multicast data flow to which the second multicast packet belongs, and the second multicast flow identifier is different from the first multicast flow identifier.

11. The first network device according to claim 10, wherein the first level information and the second level information further comprise a first device identifier identifying the first network device.

12. The first network device according to claim 10, wherein the packet is a third multicast packet, the third multicast packet comprises a third multicast packet header and the payload, the third multicast packet header comprises the first in-situ flow information telemetry information and a third multi-level flow identifier, the third multi-level flow identifier comprises third level information identifying a path that corresponds to the payload and that is from a fourth network device to a fifth network device, the fifth network device is a downstream device of the fourth network device, the third level information comprises a third multicast flow identifier identifying a multicast data flow to which the third multicast packet belongs, and the first multi-level flow identifier and the second multi-level flow identifier each further comprises the third level information.

13. The first network device according to claim 9, wherein the instructions, when executed by the at least one processor, cause the first network device to:

obtain the first multi-level flow identifier, wherein the first multi-level flow identifier comprises first series information and a first multicast flow identifier, the first series information identifies obtaining the first multicast packet and the second multicast packet based on the packet, and the first multicast flow identifier identifies a multicast data flow to which the first multicast packet belongs; and obtain the second multi-level flow identifier, wherein the second multi-level flow identifier comprises the first series information and a second multicast flow identifier identifying a multicast data flow to which the second multicast packet belongs, and the second multicast flow identifier is different from the first multicast flow identifier.

14. The first network device according to claim 13, wherein the first multi-level flow identifier and the second multi-level flow identifier further comprise a first device identifier identifying the first network device.

15. The first network device according to claim 13, wherein the packet is a third multicast packet, the third multicast packet comprises a third multicast packet header and the payload, the third multicast packet header comprises the first in-situ flow information telemetry information and a third multi-level flow identifier, the third multi-level flow identifier comprises second series information and a third multicast flow identifier identifying a multicast data flow to which the third multicast packet belongs; and wherein the obtaining of the first multicast packet and the second multicast packet based on the packet further comprises: obtaining the first series information based on the second series information of the third multi-level flow identifier of the packet.

16. The first network device according to claim 9, wherein the instructions, when executed by the at least one processor, further cause the first network device to:

send a first message and a second message to a network management device, wherein the first message carries the first multi-level flow identifier of the first multicast packet and first information, the first information is determined based on the first in-situ flow information telemetry information in the first multicast packet, the second message carries the second multi-level flow identifier of the second multicast packet and second information, and the second information is determined based on the first in-situ flow information telemetry information in the second multicast packet.

17. A non-transitory storage medium storing information comprising instructions that, when executed by at least one processor, control the at least one processor to perform operations comprising:

obtaining a packet comprising a payload;

obtaining a first multicast packet and a second multicast packet based on the packet, wherein the first multicast packet comprises a first multicast packet header and the payload, the first multicast packet header comprises first in-situ flow information telemetry information and a first multi-level flow identifier identifying a first forwarding path of the payload, the first forwarding path comprises a path from a first network device to a second network device, the second network device being a downstream device of the first network device, the second multicast packet comprises a second multicast packet header and the payload, the second multicast packet header comprises a second multi-level flow identifier and the first in-situ flow information telemetry information, the second multi-level flow identifier identifies a second forwarding path of the payload, the second forwarding path comprises a path from the first network device to a third network device, the third network device being a downstream device of the first network device, the first in-situ flow information telemetry information indicates performing in-situ flow information telemetry; and sending the first multicast packet to the second network device via the first forwarding path, and sending the second multicast packet to the third network device via the second forwarding path.

18. The non-transitory storage medium according to claim 17, wherein the obtaining a first multicast packet and a second multicast packet based on the packet comprises:

obtaining the first multi-level flow identifier, wherein the first multi-level flow identifier comprises first level information identifying a path that corresponds to the payload and that is from the first network device to the second network device, the first level information comprises a first multicast flow identifier identifying a multicast data flow to which the first multicast packet belongs; and obtaining the second multi-level flow identifier, wherein the second multi-level flow identifier comprises second level information identifying a path that corresponds to the payload and that is from the first network device to the third network device, the second level information comprises a second multicast flow identifier identifying a flow to which the second multicast packet belongs, and the second multicast flow identifier is different from the first multicast flow identifier.

19. The non-transitory storage medium according to claim 18, wherein the first level information and the second level information further comprise a first device identifier identifying the first network device.

20. The non-transitory storage medium according to claim 18, wherein the packet is a third multicast packet, the third multicast packet comprises a third multicast packet header and the payload, the third multicast packet header comprises the first in-situ flow information telemetry information and a third multi-level flow identifier, the third multi-level flow identifier comprises third level information identifying a path that corresponds to the payload and that is from a fourth network device to a fifth network device, the fifth network device is a downstream device of the fourth network device, the third level information comprises a third multicast flow identifier identifying a flow to which the third multicast packet belongs, and the first multi-level flow identifier and the second multi-level flow identifier each further comprises the third level information.

* * * * *